(12) United States Patent
Okuyama et al.

(10) Patent No.: US 11,981,785 B2
(45) Date of Patent: May 14, 2024

(54) WATER-BARRIER LAMINATED FILM

(71) Applicant: TOYO SEIKAN GROUP HOLDINGS, LTD., Tokyo (JP)

(72) Inventors: Shinpei Okuyama, Yokohama (JP);
Keisuke Takayama, Yokohama (JP);
Shunya Nangou, Yokohama (JP);
Misato Yagisawa, Yokohama (JP);
Yoshihiro Ohta, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 349 days.

(21) Appl. No.: 16/761,971

(22) PCT Filed: Nov. 7, 2018

(86) PCT No.: PCT/JP2018/041291
§ 371 (c)(1),
(2) Date: May 6, 2020

(87) PCT Pub. No.: WO2019/093357
PCT Pub. Date: May 16, 2019

(65) Prior Publication Data
US 2020/0317875 A1     Oct. 8, 2020

(30) Foreign Application Priority Data
Nov. 7, 2017    (JP) .................. 2017-214425

(51) Int. Cl.
*C08J 7/04*      (2020.01)
*B32B 7/12*      (2006.01)
(Continued)

(52) U.S. Cl.
CPC ............... *C08J 7/0423* (2020.01); *B32B 7/12* (2013.01); *B32B 9/045* (2013.01); *B32B 15/09* (2013.01);
(Continued)

(58) Field of Classification Search
None
See application file for complete search history.

(56) References Cited

U.S. PATENT DOCUMENTS 9,956,748 B2    5/2018   Okuyama et al.
2005/0072459 A1   4/2005   Bayer et al.
(Continued)

FOREIGN PATENT DOCUMENTS

CN      101250252 A    8/2008
JP       2000-255579 A   9/2000
(Continued)

OTHER PUBLICATIONS

Machine translation of JP 2012-250470 A (Year: 2012).*
(Continued)

*Primary Examiner* — Ramsey Zacharia
(74) *Attorney, Agent, or Firm* — Sughrue Mion, PLLC

(57) ABSTRACT

A water-barrier laminated film (10) including a plastic film (A) that has an inorganic barrier layer (A1) on the surface thereof and a water-trapping layer (B), characterized in that: between the plastic film (A) and the water-trapping layer (B), an isocyanate type coating (C) is provided that contains, as a film-forming component, an isocyanate type polymer obtained by reacting an isocyanate as the reaction component; and the water-trapping layer (B) is formed on the isocyanate type coating (C) that is formed as the underlying layer.

9 Claims, 3 Drawing Sheets

(51) Int. Cl.
*B32B 9/04* (2006.01)
*B32B 15/09* (2006.01)
*B32B 27/30* (2006.01)
*B32B 27/36* (2006.01)
*C08J 5/18* (2006.01)
*C08J 7/043* (2020.01)
*C08J 7/056* (2020.01)
*C09D 5/00* (2006.01)
*C09D 175/06* (2006.01)
*C09D 175/14* (2006.01)
*C09D 183/06* (2006.01)
*C09J 5/00* (2006.01)

(52) U.S. Cl.
CPC ............ *B32B 27/306* (2013.01); *B32B 27/36* (2013.01); *C08J 5/18* (2013.01); *C08J 7/043* (2020.01); *C08J 7/056* (2020.01); *C09D 5/002* (2013.01); *C09D 175/06* (2013.01); *C09D 175/14* (2013.01); *C09D 183/06* (2013.01); *B32B 2255/10* (2013.01); *B32B 2255/26* (2013.01); *B32B 2307/726* (2013.01); *B32B 2457/00* (2013.01); *C08J 2475/06* (2013.01); *C08J 2475/14* (2013.01); *C08J 2483/06* (2013.01)

(56) References Cited

U.S. PATENT DOCUMENTS

| | | | | |
|---|---|---|---|---|
| 2006/0074214 | A1* | 4/2006 | Kesselmayer | C08G 18/6662 156/331.7 |
| 2015/0368498 | A1 | 12/2015 | Okuyama et al. | |
| 2017/0067151 | A1 | 3/2017 | Nangou et al. | |
| 2017/0226625 | A1 | 8/2017 | Kawahara et al. | |
| 2018/0236757 | A1 | 8/2018 | Nangou et al. | |

FOREIGN PATENT DOCUMENTS

| | | |
|---|---|---|
| JP | 2002-011824 A | 1/2002 |
| JP | 2011-161778 A | 8/2011 |
| JP | 2012-250470 A | 12/2012 |
| JP | 2014-168949 A | 9/2014 |
| JP | 2014-168950 A | 9/2014 |
| JP | 2015-96320 A | 5/2015 |
| JP | 2015-178231 A | 10/2015 |
| JP | 2016-464 A | 1/2016 |
| JP | 2016-144873 A | 8/2016 |
| JP | 2017-35829 A | 2/2017 |
| JP | 2017-39315 A | 2/2017 |
| JP | 2010-179506 A | 8/2020 |
| WO | 2014/123197 A1 | 8/2014 |
| WO | 2015/133441 A1 | 9/2015 |
| WO | 2016/021459 A1 | 2/2016 |

OTHER PUBLICATIONS

Communication dated Feb. 18, 2022 from the Chinese Patent Office in corresponding Chinese Application No. 201880072107.3.
"Polymer Synthesis Processes", Weaver Art, ed., Wastern Technology University Press, 2011, p. 228 (3 pages total).
"ToYobo VYLON product catalog", VYLON, 2010, pp. 3-4 (8 pages total).
Office Action dated May 23, 2022 from the Japanese Patent Office in JP Application No. 2019-552832.
Office Action dated Jul. 28, 2021 by the Chinese Patent Office in Chinese Application No. 201880072107.3.
International Search Report for PCT/JP2018/041291, dated Feb. 5, 2019 (PCT/ISA/210).

* cited by examiner

WATER-BARRIER LAMINATED FILM

CROSS REFERENCE TO RELATED APPLICATIONS

This application is a National Stage of International Application No. PCT/JP2018/041291 filed Nov. 7, 2018, claiming priority based on Japanese Patent Application No. 2017-214425, filed Nov. 7, 2017.

TECHNICAL FIELD

This invention relates to a water-barrier laminated film having an inorganic barrier layer and a water-trapping layer. The invention, further, relates to a coating composition used for forming a layer that lies under the water-trapping layer.

BACKGROUND ART

As means for improving properties and, specifically, the gas-barrier property of various plastic base materials, there has been known an art of forming an inorganic thin film (inorganic barrier layer) of a silicon oxide or the like by vacuum evaporation on the surfaces of the plastic base materials (patent document 1). The film provided with such an inorganic thin film has been widely used as a barrier film.

A high degree of water-barrier property is also required for a variety of kinds of electronic devices that have been developed and put into practice in recent years, such as organic electroluminescent (organic EL) devices, solar cells, touch panels, e-papers and the like. To meet the above requirements, the present applicant has proposed a water-barrier laminate having a water-trapping layer laminated thereon (patent document 2).

The above-mentioned water-trapping layer is formed by applying a coating composition, which is for forming the water-trapping layer, on an inorganic barrier layer that has been formed by vacuum evaporation or the like on the surface of a plastic film and, thereafter, curing the coating composition.

When the water-trapping layer is formed by applying the coating composition directly on the inorganic barrier layer as described above, however, there remains a problem in that the water-trapping layer itself undergoes the cracking due to the contraction of volume during the heating and drying deteriorating, therefore, the water-barrier property and appearance of the film. Besides, adhesiveness is weak between the inorganic barrier layer and the water-trapping layer inviting, therefore, a problem of easy peeling of film (delamination) caused by the expansion of volume after having absorbed moisture.

Adhesiveness to the inorganic barrier layer can be improved by, for example, conducting the heating at 100° C. for not less than one hour after the water-trapping layer has been formed. However, the heating at a high temperature for an extended period of time is not only very detrimental to the productivity but also causes the plastic film under the inorganic barrier layer to be deformed and, besides, may accelerate the cracking in the water-trapping layer that is formed. It is, therefore, desired to improve the adhesiveness between the water-trapping layer and the inorganic barrier layer without conducting the heating at a high temperature for an extended period of time.

So far, however, no keen study has been made concerning the adhesiveness between the water-trapping layer and the inorganic barrier layer in connection with heating the water-trapping layer at 100° C. for short periods of time.

PRIOR ART DOCUMENTS

Patent Documents

Patent document 1: Japanese Patent Laid-Open No. 2000-255579
Patent document 2: Japanese Patent Laid-Open No. 2015-96320

OUTLINE OF THE INVENTION

Problems that the Invention is to Solve

It is, therefore, an object of the present invention to provide a water-barrier laminated film including a plastic film (A) that has an inorganic barrier layer (A1) on the surface thereof and a water-trapping layer (B), the plastic film (A) and the water-trapping layer (B) being excellently adhered to each other.

Another object of the present invention is to provide a coating composition for forming a layer that lies under the water-trapping layer.

Means for Solving the Problems

According to the present invention, there is provided a water-barrier laminated film including a plastic film (A) that has an inorganic barrier layer (A1) on the surface thereof and a water-trapping layer (B), characterized in that:

between the inorganic barrier layer (A1) and the water-trapping layer (B), there is provided an isocyanate type coating (C) that contains, as a film-forming component, an isocyanate type polymer obtained by reacting an isocyanate as the reaction component; and the water-trapping layer (B) is formed on the isocyanate type coating (C) that is formed as the underlying layer.

In the water-barrier laminated film of the present invention, the following embodiments can be preferably employed:

(1) The isocyanate type polymer is a polyurethane;
(2) The polyurethane is a high-Tg urethane resin having a glass transition point of not lower than 60° C.;
(3) The high-Tg urethane resin has a weight average molecular weight (Mw) of not less than 14,000;
(4) The polyurethane has a crosslinked structure that is introduced therein due to at least one kind of functional group selected from the group consisting of an epoxy group, a silanol group and an isocyanate group;
(5) The isocyanate type polymer is the one obtained by curing an isocyanate reactive resin with a polyisocyanate;
(6) The isocyanate reactive resin is a (meth)acrylic resin or a polyester resin;
(7) The isocyanate reactive resin is a high-Tg resin having a glass transition point of not lower than 60° C.;
(8) The high-Tg resin has a weight average molecular weight (Mw) of not less than 14,000;
(9) The water-trapping layer (B) contains a hygroscopic polymer;
(10) The water-trapping layer (B) has a structure in which a hygroscopic agent is dispersed in the hygroscopic matrix of an ionic polymer, the hygroscopic agent having an ultimate humidity lower than that of the matrix;
(11) The ionic polymer contained in the water-trapping layer (B) is a cationic polymer;

(12) A protection layer (D) is provided between the inorganic barrier layer (A1) and the isocyanate type coating (C);
(13) The protection layer (D) contains a water-soluble high molecular component (D1) and at least one kind of component (D2) selected from the group consisting of an organoalkoxysilane or a hydrolyzed product thereof, a metal alkoxide or a hydrolyzed product thereof, and a phosphorus type component;

The water-barrier laminated film of the present invention can be favorably used as a material for sealing electronic devices.

According to the present invention, further, there is provided a coating composition for forming a layer that lies under a water-trapping layer, the coating composition being obtained by dissolving or dispersing an urethane type granular resin in a solvent, characterized in that the solvent contains, being dissolved or dispersed therein, a curing agent having at least one kind of functional group selected from the group consisting of an epoxy group, a silanol group and an isocyanate group.

In the coating composition, it is desired that:
(1) The urethane type granular resin is a high-Tg polyurethane having a glass transition point of not lower than 60° C.;
(2) The urethane type granular resin is made from an urethane type polymer having a weight average molecular weight (Mw) of not less than 14,000;
(3) The urethane type granular resin has a particle size of 0.02 to 3 μm;
(4) As the curing agent, a polyisocyanate is contained in an amount of 1 to 50 parts by weight per 100 parts by weight of the urethane type granular resin; and
(5) As the curing agent, a silane coupling agent is contained in an amount of 0.1 to 50 parts by weight per 100 parts by weight of the urethane type granular resin.

According to the present invention, there is provided a coating composition for forming a layer that lies under a water-trapping layer, the coating composition being obtained by dissolving or dispersing an isocyanate reactive granular resin in a solvent, characterized in that said solvent contains, being dissolved or dispersed therein, a polyisocyanate as the curing agent.

In the coating composition, it is desired that:
(1) The isocyanate reactive resin is a (meth)acrylic resin or a polyester resin;
(2) The isocyanate reactive resin is a high-Tg resin having a glass transition point of not lower than 60° C.; and
(3) The high-Tg resin has a weight average molecular weight (Mw) of not less than 14,000.

Effects of the Invention

The water-barrier laminated film of the invention has a basic structure in which the water-trapping layer (B) is provided on the inorganic barrier layer (A1) that is present on the surface of the plastic film (A). Here, an important feature resides in that, between the water-trapping layer and the inorganic barrier layer, there is the isocyanate type coating (C) lying under the water-trapping layer. That is, the isocyanate type coating (C) contains, as the film-forming component (matrix), a polymer (typically, a polyurethane) obtained by the reaction of an isocyanate as the reaction component. In the invention, the water-trapping layer is formed on the isocyanate type coating (C) that is formed as the underlying layer effectively relaxing the stress that builds up in the water-trapping layer at the time of heating and drying. Therefore, the water-trapping layer is effectively prevented from cracking.

In the invention, further, the composition of the isocyanate type coating (C) is adjusted to greatly improve the adhesive force to the water-trapping layer (B). For example, as will be demonstrated in Experimental Examples appearing layer, the adhesive force is about 0.2 N/15 mm when the coating composition for forming the water-trapping layer is directly applied on the surface of the inorganic barrier layer without forming the isocyanate type coating (C) as the underlying layer.

According to the present invention, on the other hand, the isocyanate type coating (C) (e.g., urethane type coating) is formed on the surface of the inorganic barrier layer to lie under the water-trapping layer (B). In this case, an improved adhesive force is exhibited by the water-trapping layer that is formed by heating under quite the same conditions as those described above. The adhesive force greatly improves to a level of about 1 N/15 mm specifically when the crosslinking structure is introduced with a functional group of anyone of epoxy group, silanol group or isocyanate group.

The water-trapping layer (B) having an improved adhesive force as described above can be firmly held on the inorganic barrier layer via the isocyanate type coating (C), and can be effectively prevented from being peeled off.

According to the water-barrier laminated film of the present invention as described above, the water-trapping layer (B) is effectively prevented from cracking yet exhibiting its properties to a sufficient degree, i.e., showing excellent water-barrier property. Besides, even without executing the heat treatment at temperatures of not lower than 100° C. for extended periods of time, the water-trapping layer (B) can be held maintaining a large adhesive force. Accordingly, an improved degree of productivity can be guaranteed offering a very great advantage in an industrial sense.

MODES FOR CARRYING OUT THE INVENTION

Figure 1:
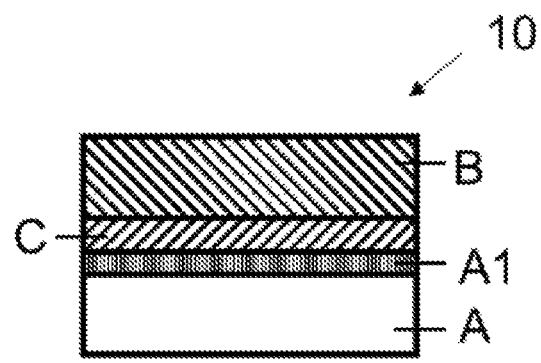
FIG. 1 It is a drawing illustrating a structure of layers of a water-barrier laminated film of the present invention.

In FIG. 1, the water-barrier laminated film of the invention generally designated at 10 has a plastic film (A) as the base material. An inorganic barrier layer (A1) is formed on the surface of the plastic film (A). On the inorganic barrier layer (A1), a water-trapping layer (B) is formed with an isocyanate type coating (C) as the underlying layer. Namely, on the inorganic barrier layer (A1) on the surface of the plastic film (A), there are formed the isocyanate type coating (C) and the water-trapping layer (B) in this order.

Figure 3:
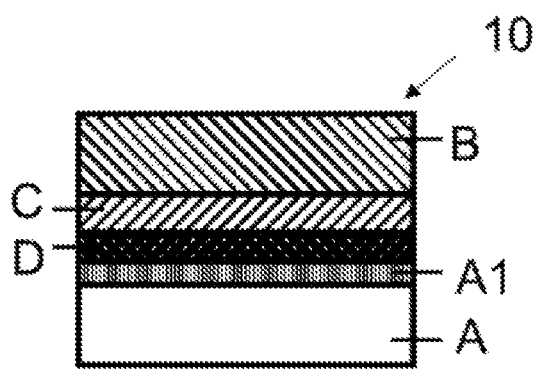
FIG. 3 It is a drawing of another structure of layers of the water-barrier laminated film.

Further, the plastic film (A) may have a protection layer (D) formed on the inorganic barrier layer (A1). That is, the isocyanate type coating (C) may be laminated directly on the inorganic barrier layer (A1) or, as shown in FIG. 3, may be laminated on the protection layer (D) that is suitably provided on the inorganic barrier layer (A1).

<Plastic film (A)>

The film (A) lies under the inorganic barrier layer (A1) and is, usually, formed by using a thermoplastic or thermosetting resin based, depending on the form thereof, on such a method as injection or co-injection forming, extrusion or co-extrusion forming, film- or sheet-forming method, compression forming or cast polymerization.

From the standpoint of formability and cost, the film is, usually, formed by using a thermoplastic resin.

As the thermoplastic resin, there can be exemplified polyolefins or cyclic olefin copolymers such as random or block copolymers of α-olefins, like low-density polyethylene, high-density polyethylene, polypropylene, poly 1-butene, poly 4-methyl-1-pentene or ethylene, propylene, 1-butene and 4-methyl-1-pentene; ethylene vinyl compound copolymers such as ethylene vinyl acetate copolymer, ethylene vinyl alcohol copolymer, and ethylene vinyl chloride copolymer; styrene type resins such as polystyrene, acrylonitrile styrene copolymer, ABS, and α-methylstyrene styrene copolymer; polyvinyl compounds such as polyvinyl chloride, polyvinylidene chloride, vinyl chloride vinylidene chloride copolymer, methyl polyacrylate and methyl polymethacrylate; polyamides such as nylon 6, nylon 6-6, nylon 6-10, nylon 11 and nylon 12; thermoplastic polyesters such as polyethylene terephthalate (PET), polybutylene terephthalate and polyethylene naphthalate (PEN); polycarbonates; polyphenylene oxides; as well as biodegradable resins such as polyimide resin, polyamideimide resin, polyetherimide resin, fluorine-contained resin, allyl resin, polyurethane resin, cellulose resin, polysulfone resin, polyethersulfone resin, ketone resin, amino resin and polylactic acid. There can be, further, used blends thereof, or the resins thereof that are suitably modified by being copolymerized (e.g., acid-modified olefin resin, etc.).

The plastic film (A) is preferably made from a gas-barrier resin having excellent oxygen-barrier property, such as ethylene vinyl alcohol copolymer, and may, further, have a multilayered structure including a layer formed by using such a gas-barrier resin.

In the invention, it is more desired that the plastic film (A) is made from a polyester resin as represented by polyethylene terephthalate (PET) or an olefin resin as represented by polyethylene or polypropylene from such standpoints as easy availability, cost, formability, barrier property against oxygen to some extent, and suitability as being formed under the inorganic barrier layer (A1) as will be described later.

There is no specific limitation on the thickness of the plastic film (A), and its thickness may be suitably determined depending on the use.

<Inorganic Barrier Layer (A1)>

The inorganic barrier layer (A1) formed on the surface of the plastic film (A) may be the one that has been known per se. as taught in, for example, Japanese Patent Laid-Open No. 2015-96320. Namely, the inorganic barrier layer (A1) can be a film that is physically deposited by such means as vacuum evaporation or ion plating, or can be an inorganic film formed by chemical deposition as represented by plasma CVD, i.e., the film formed by depositing metals or metal oxides to secure a high degree of oxygen-barrier property. Specifically, it is desired that the inorganic barrier layer (A1) is formed on the plastic film (A) that serves as the underlying layer therefor by the plasma CVD from such standpoints that it can be evenly formed even on a rough surface and that it exhibits barrier property against water as well as oxygen.

To deposit the film by the plasma CVD, the plastic film (A) that serves as the underlying layer for the inorganic barrier layer (A1) is arranged in a plasma treatment chamber in which a predetermined degree of vacuum is maintained. Then a metal for forming the film or a gas (reaction gas) of a compound containing the metal and the oxidizing gas (usually, oxygen gas or NOx gas) are fed together with a suitable carrier gas such as argon or helium through gas feed pipes into the plasma treatment chamber that has been shielded with metal walls and in which the pressure has been reduced to a predetermined degree of vacuum. In this state, a glow discharge is generated by utilizing a microwave electric field or a high-frequency electric field, a plasma is generated by the electric energy thereof, and a decomposed reaction product of the above-mentioned compound is disposed on the surface of the plastic film A to form a film thereof.

As the reaction gas, in general, it is desired to use a gas of an organometal compound such as an organoaluminum compound like trialkylaluminum, or an organotitanium compound, organozirconium compound or organosilicon compound from the standpoint of forming, in the interface to the underlying film (A), a film having a flexible region containing carbon and, further, having thereon a region that is highly oxidized and having excellent barrier property. In particular, it is most desired to use the organosilicon compound from the standpoint of relatively easily and efficiently forming the inorganic barrier layer (A1) having a high degree of barrier property against oxygen.

As the organosilicon compound, there can be used organosilane compounds such as hexamethyldisilane, vinyltrimethylsilane, methylsilane, dimethylsilane, trimethylsilane, diethylsilane, propylsilane, phenylsilane, methyltriethoxysilane, vinyltriethoxysilane, vinyltrimethoxysilane, tetramethoxysilane, tetraethoxysilane, phenyltrimethoxysilane, methyltrimethoxysilane and methyltriethoxysilane, as well as organosiloxane compounds such as octamethylcyclotetrasiloxane, 1,1,3,3-tetramethyldisiloxane and hexamethyldisiloxane. There can be, further, used aminosilane, silazane and the like.

The above-mentioned organometal compounds can be used alone or in a combination of two or more kinds.

The thickness of the above inorganic barrier layer (A1) may differ depending on the use of the water-barrier laminated film and the level of the required barrier property. Usually, however, the thickness of the inorganic barrier layer (A1) should be so selected as to secure a water vapor permeability of not more than $10^{-1}$ g/m$^2$·day/atom and, specifically, not more than $10^{-2}$ g/m$^2$·day/atom without impairing properties of the plastic film (A) on which it is deposited. Though it may differ depending on the ratio occupied by the above-mentioned highly oxidized region, the inorganic barrier layer (A1) should have a thickness of, usually, 4 to 500 nm and, specifically, about 30 to about 400 nm.

The above-mentioned inorganic barrier layer (A1) can also be formed on the plastic film (A) by a coating method or the like method instead of the vacuum evaporation. That is, the inorganic barrier layer (A1) formed by the coating method may have properties such as oxygen-barrier property and the like properties which are lower than those of the inorganic barrier layer formed by the vacuum evaporation. Depending upon the required degree of barrier property against oxygen and the like gases, however, the inorganic barrier layer (A1) may be the one that is formed by the coating method.

When the coating method is employed, the inorganic barrier layer (A1) can be typically formed by applying, onto a predetermined surface, an organic solvent solution that contains a polysilazane, a silane compound (e.g., alkoxysilane or the like) that can be polycondensed and that is suitably mixed with fine inorganic particulate material such as silica or alumina. The organic solvent solution is, thereafter, heated, and the organic solvent is volatilized to thereby form the film.

<Water-Trapping Layer (B)>

The water-trapping layer (B) is to shut off the water component that flows in the direction of thickness of the water-barrier laminated film 10. There is no specific limitation on the water-trapping layer (B) provided it exhibits the water shut-off property. The water-trapping layer (B) may be the layer that has been known per se., e.g., the layer formed by dispersing a physical desiccant such as zeolite or silica gel in a predetermined resin layer, the layer formed by dispersing a chemical desiccant such as calcium oxide in the predetermined resin layer, or the layer formed by using a hygroscopic non-ionic polymer such as polyvinyl alcohol, water-soluble nylon or polyethylene oxide.

When a specifically high degree of barrier property is required against the water, it is desired to form the layer in a structure that uses an ionic polymer disclosed in, for example, the Japanese Patent Laid-Open No. 2015-96320 as the matrix, and a hygroscopic agent is dispersed in the matrix, the hygroscopic agent having an ultimate humidity lower than that of the ionic polymer. When such an ionic polymer is contained as the matrix, the water-trapping layer traps the water excellently. Besides, the water can be confined in the hygroscopic agent that is dispersed. This makes it possible to effectively alleviate deformation such as swelling caused as a result of having absorbed the water.

Ionic Polymer;

The ionic polymer used in the invention can be a cationic polymer or an anionic polymer as described below.

The cationic polymer is a polymer that has in the molecules thereof a cationic group that could become a positive electric charge in water, such as primary to tertiary amino group, quaternary ammonium group, pyridyl group, imidazole group or quaternary pyridinium group. The cationic polymer is capable of forming a hygroscopic matrix since the cationic group therein has a strong nucleophilic action and traps water by the hydrogen bonding.

The amount of the cationic groups in the cationic polymer is, usually, such that the coefficient of water absorption (JIS K-7209-1984) of the hygroscopic matrix that is formed is not less than 5% and, specifically, 30% to 45% in an atmosphere of a humidity of 80% RH and 30° C.

As the cationic polymer, there is used the one obtained by polymerizing or copolymerizing at least one kind of a cationic monomer as represented by an amine monomer such as allylamine, ethyleneimine, vinylbenzyltrimethylamine, [4-(4-vinylphenyl)-methyl]-trimethylamine, or vinylbenzyltriethylamine; nitrogen-containing heterocyclic monomer such as vinylpyridine or vinylimidazole; or salts thereof; with other copolymerizable monomers and, further, as required, followed by the partial neutralization by the treatment with an acid.

The cationic polymers have been closely described in, for example, the Japanese Patent Laid-Open No. 2015-96320 and are not, therefore, described here in detail. Usually, however, it is desired to use the polyallylamine from the standpoint of forming the film.

On the other hand, the anionic polymer is a polymer which has in the molecules thereof an anionic functional group that could become a negative electric charge in water, such as carboxylic acid group, sulfonic acid group or phosphonic acid group, or an acid base thereof that is partly neutralized. The anionic polymer having such a functional group is capable of forming a hygroscopic matrix since the functional group therein traps water due to the hydrogen bond.

The amount of the anionic functional groups in the anionic polymer may differ depending on the kind of the functional groups but is, usually, such that the coefficient of water absorption (JIS K-7209-1984) of the hygroscopic matrix that is formed is not less than 5% and is, specifically, 30% to 45% in an atmosphere of a humidity of 80% RH and 30° C.

As the anionic polymer having the above functional group, there is used the one obtained by polymerizing or copolymerizing, with other monomers copolymerizable therewith, at least one of the anionic monomers as represented by carboxylic acid monomers such as methacrylic acid, acrylic acid and maleic anhydride; sulfonic acid monomers such as $\alpha$-halogenated vinylsulfonic acid, styrenesulfonic acid and vinylsulfonic acid; phosphonic acid monomers such as vinylphosphoric acid, etc.; or salts of monomers thereof, followed, as required, by a partial neutralization with an alkali.

The anionic polymers have also been closely described in, for example, the Japanese Patent Laid-Open No. 2015-96320 and are not, therefore, described here in detail. Usually, however, there can be used the poly(meth)acrylic acid and a partly neutralized product thereof (e.g., the one of which moiety is an Na salt).

Figure 2:
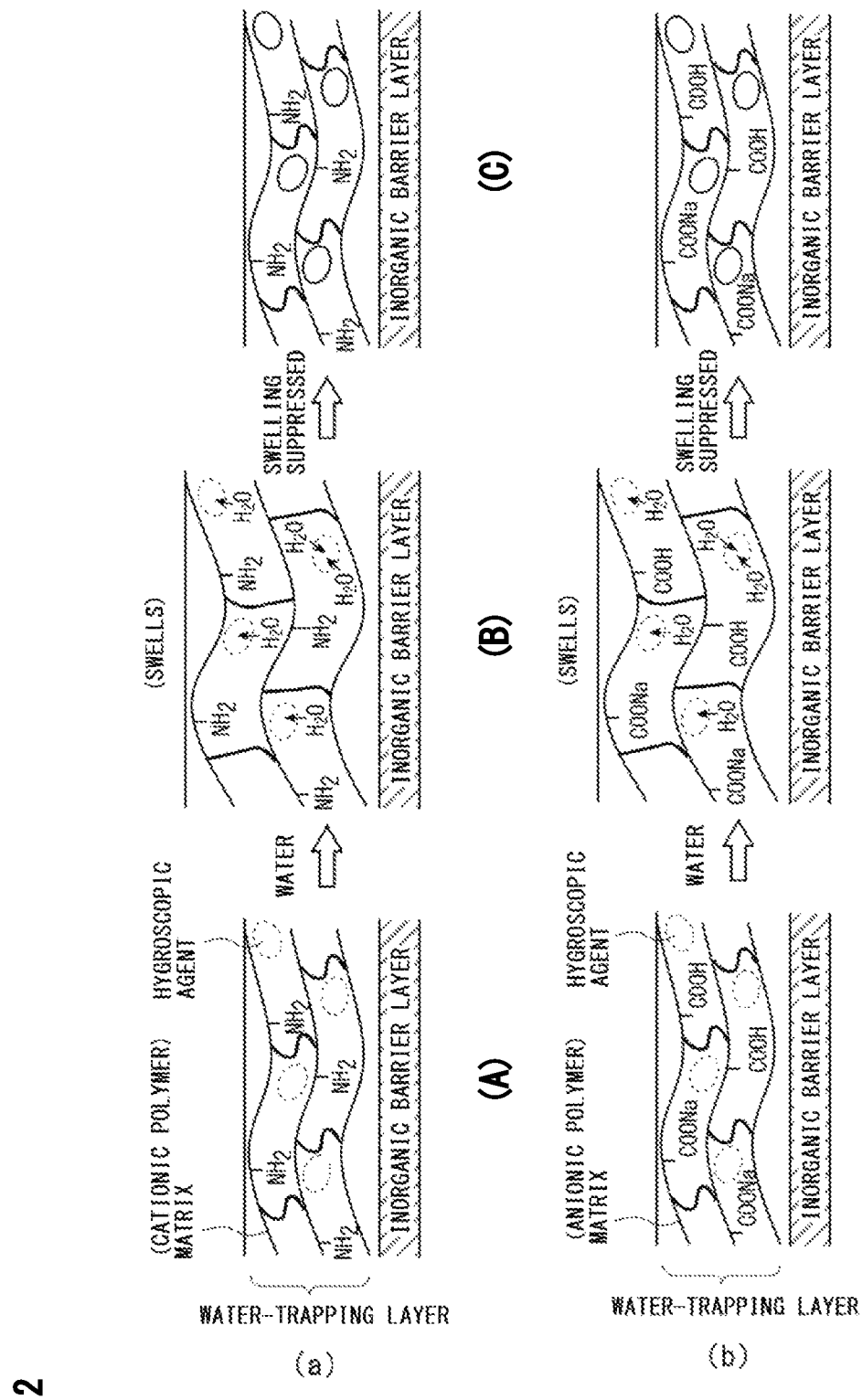
FIG. 2 It is a drawing illustrating structures of water-trapping layers (B) in the water-barrier laminated film of FIG. 1.

Structure of the Water-Trapping Layer (B);

Referring to FIG. 2(a) or (b), it is desired that the water-trapping layer (B) is blended with a hygroscopic agent having an ultimate humidity lower than that of the ionic polymer (cationic or anionic polymer) that forms the matrix.

Upon dispersing the hygroscopic agent having hygroscopic property higher than that of the matrix, the water absorbed by the matrix of the ionic polymer can now be readily trapped by the hygroscopic agent and can be effectively confined in the matrix. Therefore, the water-trapping layer (B) effectively exhibits its water-absorbing capability even in an atmosphere of a very low humidity. Furthermore, the water-trapping layer (B) is effectively suppressed from swelling despite it has absorbed the water.

As the hygroscopic agent that highly adsorbs moisture, there can be preferably used those that have ultimate humidities of not more than 6% in an environment of a humidity of 80% RH and a temperature of 30° C. provided they have ultimate humidities lower than the humidity of the ionic polymer. If the ultimate humidity of the hygroscopic agent is higher than that the ionic polymer, then the water absorbed by the matrix cannot be confined to a sufficient degree but tends to be released, and greatly improved water-barrier property cannot be expected. Further, despite the ultimate humidity is lower than that of the ionic polymer, water in an atmosphere of a low humidity cannot be trapped to a sufficient degree if the ultimate humidity measured under the above condition is higher than the above range. In this case, the water-barrier property cannot often be exhibited to a sufficient degree.

The above hygroscopic agent, usually, has a coefficient of water absorption (JIS K-7209-1984) of not less than 50% in an environment of a humidity of 80% RH and a temperature of 30° C., and is either inorganic or organic.

As the inorganic hygroscopic agent, there can be exemplified clay minerals such as zeolite, alumina, activated charcoal and montmorillonite, as well as silica gel, calcium oxide and magnesium sulfate.

As the organic hygroscopic agent, there can be exemplified an anionic polymer or a crosslinked product of a partly neutralized product thereof. As the anionic polymer, there can be exemplified the one obtained by polymerizing at least one of the anionic monomers represented by carboxylic acid monomers ((meth)acrylic acid, anhydrous maleic acid, etc.), sulfonic acid monomers (halogenated vinylsulfonic acid, styrenesulfonic acid, vinyl sulfonic acid, etc.), phosphonic acid monomers (vinylphosphoric acid, etc.) or salts of monomers thereof, or copolymerizing it with other monomers. Specifically, in the use where transparency is required, an organic hygroscopic agent is effectively used. For instance, fine particles of a crosslinked sodium poly(meth)acrylate can be representatively used as the organic hydroscopic agent.

In the invention, it is desired to use a hygroscopic agent having a small particle size (e.g., average primary particle size of less than 100 nm and, specifically, less than 80 nm) from the standpoint of exhibiting a large specific surface area and high hygroscopic property and, most desirably, to use a hygroscopic agent of an organic polymer having a small particle size.

That is, the hygroscopic agent of the organic polymer disperses very well in the matrix of the ionic polymer, i.e., disperses homogeneously. Besides, by employing an emulsion polymerization or a suspension polymerization as the polymerization method for the production thereof, the hygroscopic agent can be obtained in a fine particulate shape and in a uniform spherical shape. By adding the hygroscopic agent of the organic polymer in more than a certain amount, it is made possible to realize a very high degree of transparency.

Further, the organic fine hygroscopic agent has a very low ultimate humidity as described above, has a high hygroscopic property, and changes the volume very little despite it is swollen since it has been crosslinked. Therefore, the organic fine hygroscopic agent is best suited for bringing the environmental atmosphere to the absolutely dry state or to nearly the absolutely dry state yet suppressing a change in the volume thereof.

As fine particles of the organic hygroscopic agent, there has been placed in the market a crosslinked fine particulate Na polyacrylate (average particle size of about 70 nm) in the form of a colloidal dispersion solution (pH=10.4) in the trade name of TAFTIC HU-820E by Toyobo Co.

In the present invention, the amount of the hygroscopic agent is determined depending on the kind of the ionic polymer from the standpoint of exhibiting its properties to a sufficient degree, greatly improving the water-barrier property, effectively suppressing a change in the size caused by swelling, and maintaining the water-barrier property higher than the water-barrier property of the inorganic barrier layer (A1) over extended periods of time.

For instance, in a use where a specifically high water-barrier property is required, the water-trapping layer (B) is formed in a thickness (e.g., not less than 1 μm and, specifically, about 2 to about 20 μm) that is enough to exhibit such a high barrier property that the water vapor permeability is not more than $10^{-5}$ g/m²/day. When the matrix is formed of a cationic polymer, however, it is desired that the hygroscopic agent is used in an amount of not less than 50 parts by weight, specifically, in an amount of 100 to 900 parts by weight and, further desirably, in an amount of 200 to 600 parts by weight per 100 parts by weight of the ionic polymer in the water-trapping layer (B). Further, when the matrix is formed of an anionic polymer, it is desired that the hygroscopic agent is used in an amount of not less than 50 parts by weight, specifically, in an amount of 100 to 1300 parts by weight and, further desirably, in an amount of 150 to 1200 parts by weight per 100 parts by weight of the anionic polymer in the water-trapping layer B.

In the water-trapping layer (B) having the structure as described above, it is desired that the ionic polymer has a crosslinked structure introduced therein. That is, when the ionic polymer having the crosslinked structure absorbs the water, the molecules of the cationic polymer are locked by each other through the crosslinking. Therefore, the water-trapping layer (B) suppresses a change in the volume thereof that is caused by swelling (absorption of water), and brings about an increase in the mechanical strength and the dimensional stability.

The crosslinked structure can be introduced by adding a crosslinking agent to the coating composition that forms the water-trapping layer (B). Specifically, in the case of the anionic polymer unlike the case of the cationic polymer, the water is trapped relying only upon the hydrogen bond. Upon introducing a spatial mesh structure (crosslinked structure) adapted to absorbing moisture into the matrix, therefore, it is made possible to greatly improve the hygroscopic property.

The crosslinking agent for introducing the crosslinked structure differs to a slight degree depending upon when the crosslinked structure is introduced into the cationic polymer and when the crosslinked structure is introduced into the anionic polymer.

As the crosslinking agent for the cationic polymer, there can be used a compound having a functional group (e.g., epoxy group) capable of reacting with the cationic group and a functional group (e.g., alkoxysilyl group) capable of forming a siloxane structure in the crosslinked structure through the hydrolysis and the dehydration/condensation. Specifically, there can be preferably used a silane compound represented by the following formula (1):

$$X\text{—}SiR^1_n(OR^2)_{3-n} \qquad (1)$$

wherein X is an organic group having an epoxy group at the terminal, $R^1$ and $R^2$ are, respectively, methyl groups, ethyl groups or isopropyl groups, and n is 0, 1 or 2.

The silane compound has an epoxy group as a functional group and an alkoxysilyl group. The epoxy group undergoes the addition reaction with a functional group (e.g., $NH_2$ group) of the cationic polymer. On the other hand, the alkoxysilyl group grows by forming a silanol group (SiOH group) through the hydrolysis thereof and by forming a siloxane structure through the condensation reaction thereof and, finally, forms the crosslinked structure among the cationic polymer chains. Therefore, the matrix of the cationic polymer has, introduced therein, the crosslinked structure that has the siloxane structure.

Besides, the cationic polymer is alkaline. As a result, when the water-trapping layer B is formed by applying the coating composition that contains the cationic polymer, the addition reaction of the cationic group with the epoxy group is quickly accelerated, the dehydration and condensation are also quickly accelerated among the silanol groups, and the crosslinked structure can be easily introduced.

In the invention, as the organic group X having the epoxy group in the above formula (1), there can be representatively used a γ-glycidoxyalkyl group. For instance, a γ-glycidoxypropyltrimethoxysilane or a γ-glycidoxypropylmethyldimethoxysilane is preferably used as the crosslinking agent.

As the crosslinking agent, there can be also used the one of which the epoxy group in the above formula (1) is an alicyclic epoxy group such as epoxycyclohexyl group. For instance, when there is used, as the cross linking agent, a compound that has an alicyclic epoxy group such as β-(3, 4-epoxycyclohexyl) ethyltrimethoxysilane, there can be introduced an alicyclic structure together with the siloxane structure into the crosslinked structure of the matrix. Introduction of the alicyclic structure makes it possible to more effectively exhibit the function of the matrix which is to form a spatial mesh structure adapted to adsorbing the moisture.

In order to introduce the alicyclic structure into the above-mentioned crosslinked structure, further, it is allowable to use, as the crosslinking agent, a compound that has a plurality of epoxy groups and alicyclic groups, e.g., a diglycidyl ester represented by the following formula (2):

wherein, G is a glycidyl group and A is a divalent hydrocarbon group having an aliphatic ring, such as cycloalkylene group.

A representative example of the diglycidyl ester is expressed by the following formula (2-1).
[Chemical 1]

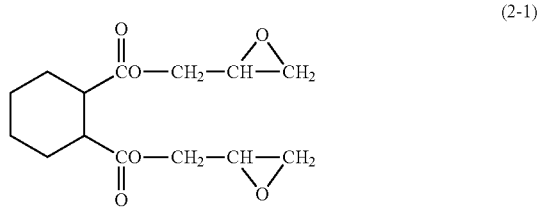

The diglycidyl ester of the formula (2) has no alkoxysilyl group. However, use of the diglycidyl ester of the formula (2) is effective in forming the spatial mesh structure in the matrix that is adapted to absorbing the moisture since it introduces the alicyclic structure in the crosslinked structure.

It is desired that the above-mentioned crosslinking agent is used in an amount of 5 to 60 parts by weight and, specifically, 15 to 50 parts by weight per 100 parts by weight of the cationic polymer. Here, it is desired that at least not less than 70% by weight and, preferably, not less than 80% by weight of the crosslinking agent is the silane compound of the above formula (1).

Further, as the crosslinking agent for introducing the crosslinked structure into the anionic polymer, there can be used a compound having two or more crosslinking functional groups (e.g., epoxy groups) capable of reacting with the ionic groups possessed by the anionic polymer. Namely, there can be preferably used the diglycidyl ester represented by the formula (2):

wherein, G is a glycidyl group, and A is a divalent hydrocarbon group having an aliphatic ring, such as cycloalkylene group,
that was also used for the coating composition for the cationic matrix.

That is, in the digycidyl ester of the above formula (2), the epoxy group reacts with the anionic group, and the crosslinked structure that contains the alicyclic structure due to the divalent group A is formed in the matrix. The crosslinked structure that contains the alicyclic structure works to further suppress the swelling.

Among the diglycidyl esters described above, preferred examples were mentioned above already. Specifically, from the standpoint of forming the spatial mesh structure adapted to adsorbing moisture, it is most desired to use the diglycidyl ester represented by the above-mentioned formula (2-1).

The crosslinking agent for the anionic polymer is used in an amount of, desirably, 150 parts by weight and, specifically, 10 to 40 parts by weight per 100 parts by weight of the anionic polymer.

Forming the Water-Trapping Layer (B);

The above-mentioned water-trapping layer (B) is formed by using a coating composition obtained by dispersing the hygroscopic agent in a resin that serves as the matrix and, as required, further, dissolving or dispersing the crosslinking agent in a predetermined solvent. Namely, the coating composition is applied onto the isocyanate type coating (C) formed on the inorganic barrier layer (A1) that will be described later, followed by heating and drying to remove the solvent. The heating and drying are, usually, carried out at a temperature of about 100 to about 170° C. for such a short period of time of not more than 3 minutes and, specifically, about 0.25 to about one minute. There is thus formed the water-trapping layer (B) that is firmly adhered to the inorganic barrier layer (A1) via the isocyanate type coating (C).

Upon conducting the heating at a high temperature of not lower than 100° C. for an extended period of time (e.g., not less than one hour), it is also possible to secure a strong adhesive force between the water-trapping layer (B) and the inorganic barrier layer (A1) without forming the isocyanate type coating (C) as the underlying layer. In this case, it is considered that the adhesive force is improved due to the condensation reaction of the reactive functional group present in the matrix resin or the crosslinking agent in the water-trapping layer (B) with the silanol group (SiOH group) present in the surface of the inorganic barrier layer (A1).

As described above already, however, such a means requires the heating at a high temperature for an extended period of time, causing the plastic film (A) lying under the inorganic barrier layer (A1) to be thermally deformed and the water-trapping layer (B) itself to be cracked resulting, therefore, in a great decrease in the rate of production. In order to avoid such inconvenience, therefore, the water-trapping layer (B) must be formed relying on the heating conducted at a temperature of not higher than 100° C. and for a short period of time.

In the coating composition used for forming the water-trapping layer (B), there is no specific limitation on the solvent if it can be volatilized and removed by heating at a relatively low temperature. For example, there can be used alcohol solvents such as methanol, ethanol, propyl alcohol and butanol; ketone solvents such as acetone and methyl ethyl ketone; mixed solvents of these solvents with water; and aromatic hydrocarbon solvents such as benzene, toluene and xylene. When a silane compound is used as the crosslinking agent, however, it is desired to use water or a mixed solvent containing water in order to accelerate the hydrolysis of the silane compound. Further, when it is attempted to form the water-trapping layer (B) containing an anionic polymer, it is desired to add an alkali (e.g., sodium hydroxide or the like) to adjust the pH to be about 8 to about 12.

The above-mentioned solvent is used in such an amount that the coating composition acquires a viscosity suited for being applied. Moreover, in order to adjust the viscosity of the coating composition or in order to adjust the coefficient of water absorption of the hygroscopic matrix that is formed to lie within a suitable range, there may be added a nonionic polymer in a suitable amount.

As the nonionic polymer, there can be used saturated aliphatic hydrocarbon polymers such as polyvinyl alcohol, ethylene-propylene copolymer and polybutylene; styrene polymers such as styrene-butadiene copolymer and the like; and polyvinyl chloride. There can also be used those non-ionic polymers obtained by copolymerizing the above polymers with various kinds of comonomers (e.g., styrene monomers such as vinyl toluene, vinyl xylene, chlorostyrene, chloromethylstyrene, α-methylstyrene, α-halogenated styrene, and α,β,β'-trihalogenated styrene; monoolefins such as ethylene and butylene; and conjugated diolefins such as butadiene and isoprene).

In the invention, it is desired that the above-mentioned water-trapping layer (B) contains, specifically, a cationic polymer as the matrix (film-forming component). That is, the water-trapping layer (B) containing the cationic polymer must be heated at a high temperature which is not lower than 100° C. and for an extended period of time in order to secure a specifically high degree of adhesiveness. According to the present invention, however, the isocyanate type coating (C) is provided as the underlying layer. This makes it possible to form the water-trapping layer (B) that is firmly adhered without the need of executing the heating at high temperatures and for long periods of time to make the most of the advantage of the invention.

<Isocyanate Type Coating (C)>

In the present invention as described above briefly, the isocyanate type coating (C) is provided between the plastic film (A) and the water-trapping layer (B). Namely, the water-trapping layer (B) is formed on the isocyanate type coating (C) that is formed as the underlying layer.

The isocyanate type coating contains, as the film-forming component, an isocyanate type polymer that is obtained using the isocyanate as the reaction component.

In the invention, the isocyanate type polymer is the one that is obtained by curing a polyurethane or an isocyanate reactive resin with a polyisocyanate.

Upon forming the isocyanate type coating (C), the isocyanate group present in the coating reacts with an MOH (M is a metal atom such as Si) present on the surface of the inorganic barrier layer or with an ionic group in the ionic polymer. As a result, the coating (C) becomes highly adhesive to the water-trapping layer (B) and prevents the water-trapping layer (B) from being delaminated.

Polyurethane;

In the above isocyanate polymer, the polyurethane is a polymer having an urethane bond (—NH—COO—) as a recurring unit, and is obtained through the urethanation reaction of the diisocyanate component and the diol component.

[Diisocyanate Components]

The diisocyanate component includes aromatic diisocyanate, aromatic-aliphatic diisocyanate, alicyclic diisocyanate and aliphatic diisocyanate.

As the aromatic diisocyanate, there can be exemplified m- or p-phenylene diisocyanate or a mixture thereof; 4,4'-diphenyl diisocyanate, 1,5-naphthalene diisocyanate (NDI), 4,4'-, 2,4'- or 2,2'-diphenylmethane diisocyanate or a mixture thereof (MDI); 2,4- or 2,6-tolylene diisocyanate or a mixture thereof (TDI); 4,4'-toluidinediisocyanate (TODI); and 4,4'-diphenylether diisocyanate.

As the aromatic-aliphatic diisocyanate, there can be exemplified 1,3- or 1,4-xylylene diisocyanate or a mixture thereof (XDI); 1,3- or 1,4-tetramethylxylylenediisocyanate or a mixture thereof (TMXDI); and ω,ω'-diisocyanatea-1,4-diethylbezene.

As the alicyclic diisocyanate, there can be exemplified 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate; IPDI), 4,4'-, 2,4'- or 2,2'-dicyclohexylmethane diisocyanate or a mixture thereof (hydrogenated MDI), methyl-2,4-cyclohexane diisocyanate, methyl-2,6-cyclohexane diisocyanate, 1,3- or 1,4-bis(isocyanatemethyl)cyclohexane or a mixture thereof (hydrogenated XDI).

As the aliphatic diisocyanate, there can be exemplified trimethylene diisocyanate, tetramethylene diisocyanate, hexamethylene diisocyanate (HDI), pentamethylene diisocyanate, 1,2-propylene diisocyanate, 1,2-, 2,3- or 1,3-butylene diisocyanate, 2,4,4- or 2,2,4-trimethylhexamethylene diisocyanate, and 2,6-diisocyanatemethyl caproate.

These diisocyanate components can be used alone or in a combination of two or more kinds. As required, it is also allowable to use a trifunctional or a more highly functional polyisocyanate in combination therewith.

[Diol Components]

The diol component includes a wide range of diols of from a low molecular diol through up to an oligomer. Examples thereof include $C_{2-12}$ alkylene glycols (e.g., ethylene glycol, 1,3- or 1,2-propylene glycol, 1,4-, 1,3- or 1,2-butanediol, 1,5-pantanediol, 3-methyl-1,5-pantanediol, 2,4-diethyl-1,5-pantanediol, 2,2,4-trimethylpentane-1,3-diol, 1,6-hexanediol, neopentyl glycol, 1,5- or 1,7-heptanediol, 1,8-octanediol, 1,9-nonanediol, 1,10-decanediol, 1,11-undecanediol, 1,12-dodecanediol, etc.); polyether diols such as polyoxy $C_{2-4}$ alkylene glycols (e.g., diethylene glycol, triethylene glycol, tetraethylene glycol, pentaethylene glycol, hexaethylene glycol, heptaethylene glycol, dipropylene glycol, tripropylene glycol, tetrapropylene glycol, pentapropylene glycol, hexapropylene glycol, heptapropylene glycol, dibutylene glycol, tributylene glycol, tetrabutylene glycol, etc.); aromatic diols (e.g., bisphenol A, bishydroxyethyl terephthalate, catechol, resorcin, hydroquinone, 1,3- or 1,4-xylylenediol or a mixture thereof, etc.); low molecular diol components such as alicyclic diols (e.g., hydrogenated bisphenol A, hydrogenated xylylenediol, cyclohexanediol, cyclohexanedimethanol, etc.); polyester diols (e.g., addition products of the above-mentioned low molecular diols with the lactone, reaction products of the above-mentioned low molecular diols with the dicarboxylic acid); and polycarbonate diols (e.g., reaction products of the above-mentioned low molecular diols with the short-chain dialkyl carbonate).

The diol components can be used alone or in a combination of two or more kinds. As required, it is also allowable to use a trifunctional or a more highly functional polyol in combination therewith.

In producing the polyurethane, there can be further used, as required, a diamine component together with the diol component. The diamine is used as a chain extender or a crosslinking agent.

As the diamine, there can be used, for example, hydrazine; aliphatic diamines (e.g., ethylenediamine, trimethylenediamine, tetramethylenediamine, pentamethylenediamine, hexamethylenediamine, 2,2,4-trimethylhexamethylenediamine, 2,4,4-trimethylhexamethylenediamine, octamethylenediamine, etc.); aromatic amines (e.g., m- or p-phenylenediamine, 1,3- or 1,4-xylylenediamine or a mixture thereof, etc.); alicyclic diamines [e.g., hydrogenated xylylenediamine, bis(4-aminocyclohexyl)methane, isophoronediamine, bis(4-amino-3-methylcyclohexyl)methane, etc.]. There can be further used a diamine having a hydroxyl group, such as 2-hydrazinoethanol, 2-[(2-aminoethyl)amino]ethanol, etc.

The diamine components can be used alone or in a combination of two or more kinds. As required, it is also allowable to use a trifunctional or a more highly functional polyamine component in combination therewith.

In the invention, the above-mentioned polyurethane for forming the isocyanate type coating (C) is produced by dispersing or dissolving the above-mentioned components in various solvents and subjecting them to the widely known urethanation reaction.

The thus obtained polyurethane is, desirably, a high-Tg polyurethane having a glass transition point of not lower than 60° C., preferably, not lower than 65° C. and, more preferably, not lower than 68° C. That is, the water-trapping layer (B) is formed on the isocyanate type coating (C) by a gravure coating while being heated at, for example, about 60° C. The water-trapping layer (B) is then dried. Here, cracks tend to occur due to the shrinkage stress at the time of forming the film or drying the film. However, use of the high-Tg polyurethane is effective in preventing the occurrence of cracks.

The polyurethane should have a molecular weight which is basically large enough to form the films. To form the water-trapping layer (B) on the isocyanate type coating (C) while effectively preventing the occurrence of cracks in the coating (C), however, it is desired that the polyurethane has a weight average molecular weight (Mw) of not less than 14,000, preferably, not less than 40,000 and, more preferably, not less than 50,000.

Moreover, it is desired that the isocyanate type coating (C) formed by using the polyurethane, further, has a crosslinked structure introduced therein by at least one kind of functional group selected from the group consisting of an epoxy group, a silanol group and an isocyanate group. This enables the isocyanate type coating (C) to secure excellent adhesiveness to the water-trapping layer (B).

The crosslinked structure can be introduced relying on the functional group. For example, the curing agent having the functional group is added to the coating composition for forming the isocyanate type coating. The crosslinked structure can then be made present in the coating (C) as it is formed and cured.

In the invention, further, there can be also used, as the isocyanate type polymer, a polymerized/cured product that is obtained by reacting an isocyanate reactive resin with the isocyanate. That is, the isocyanate groups are also made present in the polymerized/cured product, and the coating exhibits a high degree of adhesiveness to the water-trapping layer (B) and effectively prevents the water-trapping layer (B) from being delaminated.

As the isocyanate reactive resin, there can be exemplified those resins having a functional group capable of reacting with the isocyanate, such as hydroxyl group, carboxyl group or amino group and, specifically, hydroxyl group or carboxyl group. Concretely, there can be exemplified ester resin, (meth)acrylic resin, polycarbonate resin and polyvinyl alcohol. There can be, further, used an urethane resin (corresponds to the above-mentioned polyurethane) as the isocyanate reactive resin.

In the invention, there can be specifically preferably used ester resin, (meth)acrylic resin (poly(meth)acrylic acid or poly(meth)acrylic ester), and urethane resin as the isocyanate reactive resins.

It is desired that, like the above-mentioned polyurethane, the isocyanate reactive resin is a high-Tg resin having a glass transition point of not lower than 60° C., preferably, not lower than 65° C. and, more preferably, not lower than 68° C. from the standpoint of effectively preventing the occurrence of cracks at the time of forming the water-trapping layer (B). It is also desired that the isocyanate reactive resin has a weight average molecular weight of not less than 14,000, preferably, not less than 40,000 and, more preferably, not less than 50,000.

As the isocyanate to be reacted with the isocyanate reactive resin, there can be exemplified diphenylmethane diisocyanate (MDI), tolylene diisocyanate (TDI), hexamethylene diisocyanate (HDI), metaxylylene diisocyanate, tetramethylene diisocyanate, pentamethylene diisocyanate, lizine isocyanate, isophorone diisocyanate (IPDI) and polynuclear condensates of these isocyanates, which can be used alone or in a combination of two or more kinds.

From the standpoint of storage stability, the terminals of the polyisocyanate may be blocked with a blocking agent. Representative examples of the blocking agent include alcohols such as methanol, ethanol and lactate ester; phenolic hydroxide group-containing compounds such as phenol and salicylate ester; amides such as ε-caprolactam and 2-pyrolidone; oximes such as acetone oxime and methyl ethyl ketone oxime; and active methylene compounds such as methyl acetoacetate, ethyl acetoacetate, acetylacetone, dimethyl malonate and diethyl malonate, which may be used in a single kind or in a combination of two or more kinds.

[Forming the Isocyanate Type Coating (C)]

The isocyanate type coating (C) can be formed by applying, onto the inorganic barrier layer (A1), a coating composition of a solvent in which the above-mentioned polyurethane or isocyanate reactive resin has been dissolved or dispersed and in which, as required, a curing agent having a predetermined functional group has, further, been dispersed, followed by heating and firing at a temperature of not lower than 100° C.

In the invention, the coating composition uses the polyurethane or the isocyanate reactive resin in, desirably, a granular form from the standpoint of forming the coating (C) in which the isocyanate groups are homogeneously distributed. The granular resin, usually, has an integrated particle size (D50) in a range of 0.02 to 3 μm and, specifically, about 0.03 to about 1 μm calculated from a volume measured relying on the laser diffraction light scattering method.

The solvent used for forming the coating composition may be the one that can be volatilized without being heated at unnecessarily high temperatures. For instance, the solvent can be volatilized with being heated at about 100° C. For instance, there can be used water, alcohol type organic solvent, dialkyl glycol ether type solvent, ethylene glycol ether type solvent, propylene glycol ether type solvent, or a mixed solvent thereof with water, as well as ester type solvent, ketone type solvent, ether type solvent and hydrocarbon type solvent.

The solvent is used in such an amount that the coating composition assumes a viscosity adapted for being applied.

When the coating composition uses a granular polyurethane resin, it is desired to use a curing agent that has at least one of epoxy group, silanol group or isocyanate group as the functional group, the curing agent being dispersed in the solvent together with the granular polyurethane resin. A crosslinked structure is thus introduced into the isocyanate type coating (C) that is formed contributing to further improving the adhesiveness to the water-trapping layer (B) (or the inorganic barrier layer (A1)).

As the curing agent having epoxy group or silanol group as the functional group, there can be used, for example, a silane coupling agent.

As the silane coupling agent, though not limited thereto only, there can be exemplified methyltrimethoxysilane, methyltriethoxysilane, methyltrichlorosilane, dimethyldichlorosilane, trimethylchlorosilane, vinyltrimethoxysilane, vinytriethoxysilane, vinyltrichlorosilane, vinyltriacetoxysilane, vinyltris(β-methoxyethoxy)silane, γ-methacryloyloxypropyltrimethoxysilane, γ-methacryloyloxypropyltris(β-methoxyethoxy)silane, γ-chloropropyltrimethoxysilane, γ-chloropropylmethyldimethoxysilane, γ-glycidoxypropyltrimethoxysilane, γ-glycidoxypropylmethyldiethoxysilane, β-(3,4-epoxycyclohexyl)ethyltrimethoxysilane, N-phenyl-γ-aminopropyltrimethoxysilane and hexamethyldisilazane, which can be used alone or in a combination of two or more kinds.

Among these silane coupling agents, it is particularly desired to use the silane coupling agent containing the glycidyl group or the epoxy group, such as γ-glycidoxypropyltrimethoxysilane, γ-glycidoxypropylmethyldiethoxysilane or β-(3,4-epoxycyclohexyl)ethyltrimethoxysilane from the standpoint of adhesiveness to the water-trapping layer (B).

The silane coupling agent is added in an amount of 0.1 to 50 parts by weight, preferably, 1 to 30 parts by weight and, more preferably, 5 to 20 parts by weight per 100 parts by weight of the granular polyurethane resin in the coating composition.

As the curing agent having the isocyanate group as the functional group, there can be exemplified the above-mentioned polyisocyanate.

The polyisocyanate is, usually, used in an amount of 1 to 50 parts by weight, preferably, 5 to 40 parts by weight and, more preferably, 10 to 30 parts by weight per 100 parts by weight of the granular urethane resin in the coating composition.

It is allowable to use the above-mentioned silane coupling agent and polyisocyanate in combination.

Further, when the coating composition uses the isocyanate reactive resin and, specifically, the non-urethane type resin such as ester type resin or (meth)acrylic type resin, the above-mentioned polyisocyanate must be used as the curing agent in order to introduce the isocyanate group.

The polyisocyanate, too, is used in an amount of 1 to 50 parts by weight, preferably, 5 to 40 parts by weight and, more preferably, 10 to 30 parts by weight per 100 parts by weight of the granular isocyanate reactive resin in the coating composition. The above-mentioned silane coupling agent can be also used in combination with the polyisocyanate.

In the invention, the coating composition may be blended with a variety kinds of agents so far as they do not impair the adhesiveness between the isocyanate type coating (C) and the water-trapping layer (B) that are formed.

As the blending agents, there can be exemplified laminar inorganic compound, stabilizers (antioxidant, heat stabilizer, ultraviolet ray absorber, etc.), plasticizer, antistatic agent, lubricant, anti-blocking agent, coloring agent, filler and crystal nucleating agent. It is allowable, as a matter of course, to add small amounts of resins having no reactivity to the isocyanate, such as olefin type resins so far as they do not impair the adhesiveness.

<Protection Layer (D)>

In the invention as shown in FIG. 1, the isocyanate type coating (C) is formed on the inorganic barrier layer (A1), and the water-trapping layer (B) is formed on the isocyanate type coating (C). The invention, however, is in no way limited to this embodiment only. For example, as shown in FIG. 3, it is also allowable that a protection layer (D) is formed on the inorganic barrier layer (A1), and the isocyanate type coating (C) is formed on the protection layer (D).

The protection layer (D) is to prevent the inorganic barrier layer (A1) after it is formed from being peeled off, scratched or damaged. No special limitation is imposed on the protection layer (D) if it does not deteriorate the barrier property of the barrier film in, for example, an acceleration testing environment (in an environment of 85° C.-85% RH). Usually, the protection layer (D) is formed by using not less than 2 kinds of compounds or a blended of the following components (D1) and (D2).

The component (D1) is a water-soluble high molecular component such as polyvinyl alcohol, polyvinyl pyrrolidone, starch, methyl cellulose, carboxymethyl cellulose or sodium alginate. The polyvinyl alcohol is specifically preferred.

The component (D2) is at least one compound selected from the group consisting of organoalkoxysilane or a hydrolyzed product thereof, a metal alkoxide or a hydrolyzed product thereof, and a phosphorus type compound.

The organoalkoxysilane is represented by, for example, the following formula (3):

$$R—Si(OR')_3 \quad (3)$$

wherein R is an organic group, and R' is an alkyl group.

As the organic group, there can be exemplified alkyl group as well as groups having various kinds of functional groups (e.g., (meth)acryloyl group, vinyl group, amino group, epoxy group, isocyanate group, etc.).

As the alkyl group represented by R', though there is no specific limitation, there can be, usually, exemplified lower alkyl groups having not more than 4 carbon atoms (e.g., methyl group, ethyl group, propyl group and butyl group).

As the organoalkoxysilane, there can be exemplified ethyltrimethoxysilane, (meth)acryloxypropyltrimethoxysilane, vinyltrimethoxysilane, glycidoxytrimethoxysilane, glycidoxypropyltrimethoxysilane, epoxycyclohexylethyltrimethoxysilane, isocyanatepropyltrimethoxysilane and hydrolyzed products thereof, which can be used in a single kind or in a combination of two or more kinds. Among them, particularly preferred examples are glycidoxytrimethoxysilane and epoxycyclohexylethyltrimethoxysilane containing epoxy group, as well as isocyanatepropyltrimethoxysilane containing isocyanate group. The organosilanes are not limited to the monomers only but may also be such compounds as dimers or trimers depending on the structures thereof.

The metal alkoxide is a compound represented by the following formula (4):

$$M(OR')_n \quad (4)$$

wherein M is a metal atom, R' is an alkyl group like the case of the above formula (3), and n is an integer representing the valence of the metal atom M.

As the metal alkoxide, there can be exemplified tetraethoxysilane and tripropoxyaluminum. These metal alkoxides, too, are used in a single kind or in a combination of two or more kinds.

The above-mentioned organoalkoxysilane and metal alkoxide can be each used as the component (D2) even in the form of hydrolyzed products.

The hydrolyzed products can be obtained by a known method using an acid or an alkali. In conducting the hydrolysis, there can be used, as required, a reaction catalyst such as a tin compound or the like.

As the phosphorus compound, there can be exemplified phosphoric acid and salts thereof. Concretely, there can be exemplified orthophosphoric acid, pyrophosphoric acid, metaphosphoric acid, and alkali metal salts and ammonium salts thereof; and trimetaphosphoric acid, tetrametaphosphoric acid, hexametaphosphoric acid and condensed phosphoric acid such as ultrametaphosphoric acid, as well as alkali metal salts and ammonium salts thereof. It is also allowable to use a phosphate ester such as triphenyl phosphate.

These phosphorus compounds, too, can be used in a single kind or in a combination of two or more kinds.

The above-mentioned components (D1) and (D2) are melted and mixed together at a mass ratio of (D1)/(D2)=99/1 to 70/30. The melted mixture is then applied onto the surface of the inorganic barrier layer (A1) to form the protection layer (D).

The thus formed protection layer (D) has a thickness which is, usually, in a range of 0.01 to 50 μm and, specifically, 0.1 to 2 μm.

In the examples of FIGS. 1 and 3 of the invention, the inorganic barrier layer (A1) is provided on only one surface of the plastic film (A). It is, however, also allowable to form the inorganic barrier layers (A1) on both surfaces of the film (A), as a matter of course. Moreover, the isocyanate type coatings (C) and the water-trapping layers (B) can also be formed on the inorganic barrier layers (A1) that are formed on both surfaces.

To obtain the water-barrier laminated film 10 of the invention having the above-mentioned structure of layers, the water-trapping layer (B) is formed according to the procedure described above. Thereafter, water is released from the water-trapping layer (B), and a drying film is stuck on the surface of the water-trapping layer (B) to store the film in the protected state. To use the water-barrier laminated film, the drying film is removed.

By further forming the isocyanate type coating (C), the water-trapping layer (B) can be dry-laminated on another barrier film or can be laminated on another water-trapping film (B) provided with the barrier film.

<Use>

The water-barrier laminated film has the water-trapping layer that is closely adhered thereto without the need of conducting the heat treatment at high temperatures for extended periods of time. This is a very great advantage from the standpoint of productivity.

Moreover, the water-trapping layer is effectively prevented from being cracked or peeled and, therefore, exhibits excellent water-barrier property maintaining stability. Therefore, the water-barrier laminated film can be favorably used as a film for sealing various kinds of electronic devices and electronic circuits such as organic EL devices, solar cells and e-papers.

EXAMPLES

<Measuring the Glass Transition Temperature of the Isocyanate Reactive Resin>

A film of the isocyanate reactive resin was provided, and was subjected to the differential scanning calorimetry and the quantitative analysis under the following conditions. Values at the time of the second scanning were recorded.
Apparatus: DSC 6220 manufactured by Seiko Instrument Co. (differential scanning calorimetry)
 Sample: amount of sample, 5 to 10 mg
  Measuring conditions: nitrogen atmosphere, measured over a range of −50 to 200° C. while elevating the temperature at a rate of 20° C./min.

<Measuring the Molecular Weight of the Water-Dispersed Urethane Resin>

An aqueous dispersion solution of a water-dispersed urethane type polymer was freeze-dried. The obtained freeze-dried product was dissolved in an eluent of dimethylformamide (MDF) and was adjusted. The obtained solution was left to stand overnight. The solution was filtered through a 0.45 μm membrane filter. The filtrate was measured by the GPC (calculated as polystyrene) to find the weight average molecular weight (Mw).
 Detector: Shodex RI-101
 Separation column: Shodex OHpak SB-806M HQX2
 Eluent: 10 mmol/L lithium bromide in DMF
 Flow rate: 1.0 ml/min
 Column temperature: 50° C.

<Measuring the Molecular Weight of the Isocyanate Reactive Resin Soluble in Chloroform>

The isocyanate reactive resin soluble in the chloroform was measured for its average molecular weight by a method described below.

3 Milliliters of a solvent was added to about 10 mg of the sample followed by mild stirring at room temperature. After having confirmed with the eye that the sample has been dissolved, the solvent was filtered through the 0.45 μm filter. The filtrate was measured by the GPC (calculated as polystyrene) to find the weight average molecular weight (Mw). The polystyrene was used as the standard.
 Apparatus: HLC-8120 manufactured by Toso Co.
 Detector: Differential refractometer RI
 Column: TSKgel Super HM-HX2 and, as a guard column, TSKguard column Super H-H
 Medium: chloroform
 Flow rate: 0.5 mL/min
 Column temperature: 40° C.

<Evaluating the Clacks>

The sample water-barrier laminated films of the A4 size were evaluated with the eye for the presence of cracks. The samples with cracks developed all over the film surfaces were evaluated to be X, the samples with some cracks developed along the edges of the films were evaluated to be Δ, and the samples with no crack were evaluated to be ○.

<Adhesive Strength>

By using an epoxy adhesive, a PET film was dry-laminated on the water-barrier laminated film. To cure the adhesive layer, the laminated film was aged at 50° C. for 3 days. Test pieces for T-peel testing were thus prepared.

Relying on the T-peel testing in an atmosphere of 23° C. and 50% RH, the test pieces (n=4) having a width of 15 mm and a length of 200 mm (inclusive of 50 mm of non-adhered portion) were measured for their strengths of lamination (unit: N/15 mm) between the water-barrier laminated film and the PET under a condition of a peeling rate of 300 mm/min.

The test pieces with not less than 1 N/15 mm were evaluated to be ○, whereas the test pieces with less than 1 N/15 mm were evaluated to be X.

<Preparation of a Coating Solution (B1) for Forming the Water-Trapping Layer Using the Cationic Polymer>

A polymer solution was obtained by diluting, as the cationic polymer, a polyallylamine (PAA-15C, aqueous solution, 15% of solid content, produced by Nittobo Medical Co.) with the water such that the solid content thereof was 5% by weight.

On the other hand, a solution of the crosslinking agent was prepared by dissolving, as the crosslinking agent, a γ-glycidoxypropyltrimethoxysilane in water so that the amount thereof was 5% by weight.

Next, the polymer solution and the crosslinking agent solution were mixed together such that the amount of the γ-glycidoxypropyltrimethoxysilane was 20 parts by weight per 100 parts by weight of the polyallylamine. To the mixed solution was further added, as the hydroscopic agent, a crosslinked product of the Na polyacrylate (TAFTIC HU-820E, aqueous dispersion, 13% of solid content, manufactured by Toyobo Co.) such that the amount thereof was 420 parts by weight relative to the polyallylamine. The mixture thereof was further adjusted with water such that the solid component was 5%. The mixture was stirred well to prepare a coating solution (B1) for forming the water-trapping layer.

<Preparation of a Coating Solution (B2) for Forming the Water-Trapping Layer Using the Anionic Polymer>

As the anionic polymer, a polyacrylic acid (AC-10LP manufactured by Nihon Jyunyaku Co.) was dissolved in a mixed solvent of water/acetone (weight ratio of 80/20) such that the solid component was 5% by weight. The sodium hydroxide was then added thereto such that the neutralization rate of the polyacrylic acid was 80%, and a polymer solution was thus obtained.

To the polymer solution was added, as the crosslinking agent, a diglycidyl 1,2-cyclohexanedicarboxylate in an amount of 20 parts by weight relative to the partly neutralized product of the polyacrylic acid. Next, as the adhesive agent, a β-(3,4-epoxycyclohexyl)ethyltrimethoxysilane was added in an amount of 3 parts by weight relative to the partly neutralized product of the polyacrylic acid. Moreover, a granular hygroscopic agent (TAFTIC HU-820E, aqueous dispersion, 13% of solid content, manufactured by Toyobo Co.) was added in an amount of 431 parts by weight relative to the partly neutralized product of the polyacrylic acid. Moreover, the mixture thereof was adjusted with the water/acetone mixed solvent (weight ratio of 80/20) such that the whole solid content was 5% by weight. The resulting mixture was then stirred well to prepare a coating solution (B2) for forming the water-trapping layer.

<Preparation of a Coating Solution (B3) for Forming the Water-Trapping Layer Using the Nonionic Polymer>

A polymer solution was obtained by diluting, as the nonionic polymer, a polyvinyl alcohol (PVA 103 produced by Kuraray Co.) with the water so that the solid content thereof was 5% by weight.

On the other hand, a solution of the crosslinking agent was prepared by dissolving, as the crosslinking agent, a γ-glycidoxypropyltrimethoxysilane in water such that the amount thereof was 5% by weight. Next, the polymer solution and the crosslinking agent solution were mixed together such that the amount of the γ-glycidoxypropyltrimethoxysilane was 20 parts by weight per 100 parts by weight of the polyallylamine. To the mixed solution was further added, as the hydroscopic agent, a crosslinked product of the Na polyacrylate (TAFTIC HU-820E, aqueous dispersion, 13% of solid content, manufactured by Toyobo Co.) such that the amount thereof was 420 parts by weight relative to the polyallylamine. The mixture thereof was further adjusted with water such that the solid content was 5%. The mixture was stirred well to prepare a coating solution (B3) for forming the water-trapping layer.

Example 1

There was provided an isocyanate reactive resin solution (wpb-341, 30% of solid content, manufactured by Mitsui Kagaku Co.) containing a water-dispersed granular urethane type resin (Mw=1,000,000, glass transition point=68° C., average particle size of 55 nm).

The isocyanate reactive resin solution was blended with a silane coupling agent (3-glycidyloxypropyltrimethoxysilane) as the curing agent in such an amount that the solid content of the curing agent was 5 parts by weight per 100 parts by weight of the solid content of the isocyanate reactive resin solution. The blend thereof was then diluted with a mixed solvent of water and 2-propanol to prepare an isocyanate type coating solution containing 20% of the solid content.

There was provided a commercially available barrier film (GL-RD, substrate: PET (12 μm), manufactured by Toppan Insatsu Co.) having a protection layer (D) on a silicon oxide layer (inorganic barrier layer). The protection layer (D) comprises a polyvinyl alcohol and a tetraethoxysilane.

By using a bar coater, the above isocyanate type coating solution was applied onto the protection layer (D) of the barrier film, and was heat-treated in an electric oven under the conditions of a peak temperature of 100° C. and a peak temperature-holding time of one minute to thereby obtain an isocyanate type coating (C) of a thickness of 0.5 μm.

By using the bar coater, the above cationic polymer-containing coating solution (B1) for forming the water-trapping layer was applied onto the isocyanate type coating (C), and was heat-treated under the conditions of a peak temperature of 100° C. and a peak temperature-holding time of 40 seconds to form a 4 μm-thick water-trapping layer (B) to thereby obtain a water-barrier laminated film 10.

Example 2

An isocyanate type coating solution was prepared in the same manner as in Example 1 but changing the amount of the solid content of the curing agent into 20 parts by weight per 100 parts by weight of the solid content of the main polymer solution.

A water-barrier laminated film 10 was obtained by the same method as that of Example 1 but using the above isocyanate type coating solution.

Example 3

The isocyanate reactive resin solution provided in Example 1 was used. The solution was blended with a blocked isocyanate (XWB-F206MEDG manufactured by Mitsui Kagaku Co.) as the curing agent in such an amount that the solid content of the curing agent was 10 parts by weight per 100 parts by weight of the solid content of the main agent. The blend thereof was diluted with the mixed solvent of water and 2-propanol to thereby prepare an isocyanate type coating solution containing 20% of the solid content.

A water-barrier laminated film 10 was obtained by the same method as that of Example 1 but using the above isocyanate type coating solution.

Example 4

An isocyanate type coating solution was prepared in the same manner as in Example 3 but changing the amount of the solid content of the curing agent into 30 parts by weight per 100 parts by weight of the solid content of the isocyanate reactive resin solution.

A water-barrier laminated film 10 was obtained by the same method as that of Example 1 but using the above isocyanate type coating solution.

Example 5

An isocyanate type coating solution was prepared in the same manner as in Example 3 but changing the amount of the solid content of the curing agent into 50 parts by weight per 100 parts by weight of the solid content of the isocyanate reactive resin solution.

A water-barrier laminated film 10 was obtained by the same method as that of Example 1 but using the above isocyanate type coating solution.

Example 6

An isocyanate type coating (C) was formed in a thickness of 0.5 μm on the protection layer (D) of a commercially available barrier film in the same manner as in Example 3.

By using the bar coater, an anionic polymer-containing coating solution (B2) for forming the water-trapping layer was applied onto the above isocyanate type coating (C), and was heat-treated under the conditions of a peak temperature of 100° C. and a peak temperature-holding time of 40 seconds to form a 4 μm-thick water-trapping layer (B) to thereby obtain a water-barrier laminated film 10.

Example 7

A water-barrier laminated film 10 was obtained in the same manner as in Example 6 but forming a 4 μm-thick water-trapping layer (B) by using a nonionic polymer-containing coating solution (B3) as the coating material for forming the water-trapping layer.

Example 8

There was provided a commercially available barrier film (Techbarrier LX, substrate: PET 12 μm, manufactured by Mitsubishi Jushi Co.) having a silicon oxide layer as the inorganic barrier layer but without having the protection layer (D).

An isocyanate type coating solution was prepared in the same manner as in Example 3.

By using the bar coater, the isocyanate type coating solution was applied onto the inorganic barrier layer of the above barrier film, and was heat-treated in the electric oven under the conditions of a peak temperature of 100° C. and a peak temperature-holding time of one minute to form a 0.5 μm-thick isocyanate type coating (C).

By using the bar coater, the cationic polymer-containing coating solution (B1) for forming the water-trapping layer was applied onto the above isocyanate type coating (C), and was heat-treated under the conditions of a peak temperature of 100° C. and a peak temperature-holding time of 40 seconds to form a 4 μm-thick water-trapping layer (B1) to thereby obtain a water-barrier laminated film 10.

Example 9

An isocyanate type coating solution was prepared in the same manner as in Example 3. By using the isocyanate type solution, an urethane coating (C) was formed on the protection layer (D) of the commercially available barrier film in the same manner as in Example 1, and a water-trapping layer (B) containing the cationic polymer was further formed thereon.

Next, by using the bar coater, the above urethane coating solution was applied onto the other surface of the barrier film (surface of the PET film) on which the isocyanate type coating (C) and the water-trapping layer (B) have been formed already as described above. The urethane coating solution was then heat-treated in the electric oven under the conditions of a peak temperature of 100° C. and a peak temperature-holding time of 3 minutes to form an isocyanate type coating layer (C) of a thickness of 0.5 μm.

By using the bar coater, furthermore, the cationic polymer-containing coating solution (B1) for forming the water-trapping layer was applied onto the isocyanate type coating (C) that has been formed on the other surface. The coating solution (B1) for forming the water-trapping layer was then heat-treated under the conditions of a peak temperature of 100° C. and a peak temperature-holding time of 40 seconds to form a water-trapping layer (B) of a thickness of 4 μm. There was thus obtained a water-barrier laminated film 10 having the water-trapping layers (B) on both surfaces thereof.

Example 10

There was provided a main polymer solution (Aracoat DA-105, 30% of solid content, produced by Arakawa Kagaku Kogyo C.) containing an acrylic resin (Mw=69,000, glass transition point=70° C.)

The main polymer solution was blended with a polycyanate (D-110N produced by Mitsui Kagaku Co.) as the curing agent in an amount of 10 parts by weight per 100 parts by weight of the solid content of the main polymer solution. The blend thereof was then diluted with the methyl ethyl ketone to prepare an isocyanate type coating solution containing 20% of the solid content.

There was provided a commercially available barrier film (GX, substrate: PET (12 μm), produced by Toppan Insatsu Co.) having a protection layer (D) on the aluminum oxide layer (inorganic barrier layer). The protection layer (D) comprises a polyvinyl alcohol and a tetraethoxysilane.

By using the bar coater, the above isocyanate type coating solution was applied onto the protection layer (D) of the barrier film, and was heat-treated in the electric oven under the conditions of a peak temperature of 100° C. and a peak temperature-holding time of one minute to obtain an isocyanate type coating (C) of a thickness of 0.5 μm.

By using the bar coater, the cationic polymer-containing coating solution (B1) for forming the water-trapping layer was applied onto the isocyanate type coating (C). The coating solution (B1) for forming the water-trapping layer was then heat-treated under the conditions of a peak temperature of 100° C. and a peak temperature-holding time of 40 seconds to form a 4 μm-thick water-trapping layer (B) to thereby form a water-barrier laminated film 10.

Example 11

An isocyanate type coating solution was prepared in the same manner as in Example 10 but changing the amount of the solid content of the curing agent into 20 parts by weight per 100 parts by weight of the solid content of the main polymer solution.

A water-barrier laminated film 10 was obtained by the same method as that of Example 10 but using the above isocyanate type coating solution.

Example 12

A polyester resin (Vylon GK880, Mw=55,000, glass transition point=81° C., produced by Toyobo Co.) was diluted with the methyl ethyl ketone (MEK) to prepare an anchor coating solution containing 20% of the solid content.

The main polymer solution was blended with a polyisocyanate (D-110N produced by Mitsui Kagaku Co.) as the curing agent in an amount of 10 parts by weight per 100 parts by weight of the solid content of the main polymer solution. The blend was then diluted with the methyl ethyl ketone to prepare an urethane coating solution containing 20% of the solid content.

A water-barrier laminated film 10 was obtained by the same method as that of Example 10 but using the above isocyanate type coating solution.

Example 13

There was provided a main polymer solution (Elitel KA-3356 produced by Unitika Co.) containing a polyester resin (Mw=14,000, glass transition point=83° C.)

The main polymer solution was blended with a blocked isocyanate (XWB-F206 MEDG produced by Mitsui Kagaku Co.) as the curing agent in such an amount that the solid content of the curing agent was 10 parts by weight per 100 parts by weight of the solid content of the main polymer solution. The blend was then diluted with the mixed solvent of water and 2-propanol to thereby prepare an isocyanate type coating solution containing 20% of the solid content.

There was provided the commercially available barrier film (GX, substrate: PET (12 μm), produced by Toppan Insatsu Co.) having a protection layer (D) on the aluminum oxide layer (inorganic barrier layer). The protection layer (D) comprises the polyvinyl alcohol and the tetraethoxysilane.

By using the bar coater, the above isocyanate type coating solution was applied onto the protection layer (D) of the barrier film, and was heat-treated in the electric oven under the condition of a peak temperature of 130° C. and a peak temperature-holding time of 5 minutes to obtain an isocyanate type coating (C) of a thickness of 0.5 μm.

By using the bar coater, the cationic polymer-containing coating solution (B1) for forming the water-trapping layer was applied onto the isocyanate type coating (C). The coating solution (B1) for forming the water-trapping layer was then heat-treated under the conditions of a peak temperature of 100° C. and a peak temperature-holding time of 40 seconds to form a 4 μm-thick water-trapping layer (B) to thereby obtain a water-barrier laminated film 10.

Example 14

There was provided a main polymer solution (Elitel KT-8803 produced by Unitika Co.) containing a polyester resin (Mw=41,000, glass transition point=68° C.)

The main polymer solution was blended with an isocyanate (WD-725 produced by Mitsui Kagaku Co.) as the curing agent in such an amount that the solid content of the curing agent was 10 parts by weight per 100 parts by weight of the solid content of the main polymer solution. The blend was then diluted with the mixed solvent of water and 2-propanol to thereby prepare an isocyanate type coating solution containing 20% of the solid content.

A water-barrier laminated film 10 was obtained by the same method as that of Example 10 but using the above isocyanate type coating solution.

Example 15

A polyester resin (Vylon V600, Mw=39,000, glass transition point=47° C., produced by Toyobo Co.) was diluted with the methyl ethyl ketone (MEK) to prepare an anchor coating solution containing 20% of the solid content.

There was used the main polymer solution provided in Comparative Example 1. The main polymer solution was blended with the polyisocyanate (D-110N produced by Mitsui Kagaku Co.) as the curing agent in such an amount that the solid content of the curing agent was 10 parts by weight per 100 parts by weight of the solid content of the main agent. The blend was then diluted with the methyl ethyl ketone to prepare an urethane coating solution containing 20% of the solid content.

A water-barrier laminated film 10 was obtained by the same method as that of Example 10 but using the above urethane coating solution.

Comparative Example 1

The polyester resin (Vylon V600, Mw=39,000, produced by Toyobo Co.) was diluted with the methyl ethyl ketone (MEK) to prepare an anchor coating solution containing 20% of the solid content.

A water-barrier laminated film 10 was obtained by the same method as that of Example 10 but forming the layer that lies under the water-trapping layer (B) by changing the anchor coating solution into the isocyanate type coating solution.

Comparative Example 2

A water-barrier laminated film 10 was obtained in the same manner as in Example 1 but forming a 4 μm-thick water-trapping layer (B) by applying the cationic polymer-containing coating solution (B1) for forming the water-trapping layer onto the protection layer (D) of the barrier film without, however, forming the isocyanate type coating (C).

Comparative Example 3

There was provided a commercially available barrier film having, as the inorganic barrier layer, a silicon oxide layer that was also used in Example 10 but having no protection layer (D).

A water-barrier laminated film 10 was obtained by forming, like in Comparative Example 2, the cationic polymer-containing 4 μm-thick water-trapping layer (B) on the inorganic barrier layer of the barrier film.

<Testing and Evaluation>

The water-barrier laminated films 10 prepared above were measured for their properties by the methods described above. The results were as shown in Table 1.

TABLE 1

| | Water-trapping layers Polarity of matrix polymer | Anchor coating solutions in the water-barrier layers | | | | Evaluation of anchor layers | |
|---|---|---|---|---|---|---|---|
| | | Amount of main component (pts by wt) | Tg of main agent | Main polymer Mw × 10³ | Amount of curing agent (pts by wt) | Appearance | Strength of adhesion |
| Ex. 1 | cationic | 100 | 68 | 1000 | 5 | ◯ | ◯ |
| Ex. 2 | cationic | 100 | 68 | 1000 | 20 | ◯ | ◯ |
| Ex. 3 | cationic | 100 | 68 | 1000 | 10 | ◯ | ◯ |

TABLE 1-continued

| | Anchor coating solutions in the water-barrier layers | | | | | | |
|---|---|---|---|---|---|---|---|
| | Water-trapping layers Polarity of matrix polymer | Amount of main component (pts by wt) | Tg of main agent | Main polymer Mw × 10³ | Amount of curing agent (pts by wt) | Evaluation of anchor layers | |
| | | | | | | Appearance | Strength of adhesion |
| Ex. 4 | cationic | 100 | 68 | 1000 | 30 | ○ | ○ |
| Ex. 5 | cationic | 100 | 68 | 1000 | 50 | ○ | ○ |
| *Ex. 6 | anionic | 100 | 68 | 1000 | 10 | ○ | ○ |
| Ex. 7 | nonionic | 100 | 68 | 1000 | 10 | ○ | ○ |
| Ex. 8 | cationic | 100 | 68 | 1000 | 10 | ○ | ○ |
| *Ex. 9 | cationic | 100 | 68 | 1000 | 10 | ○ | ○ |
| Ex. 10 | cationic | 100 | 70 | 69 | 10 | ○ | ○ |
| Ex. 11 | cationic | 100 | 70 | 69 | 20 | ○ | ○ |
| Ex. 12 | cationic | 100 | 81 | 55 | 10 | ○ | ○ |
| Ex. 13 | cationic | 100 | 83 | 14 | 10 | Δ | ○ |
| Ex. 14 | cationic | 100 | 68 | 41 | 10 | Δ | ○ |
| Ex. 15 | cationic | 100 | 47 | 39 | 10 | x | ○ |
| Comp. Ex. 1 | cationic | 100 | 47 | 39 | not added | x | x |
| Comp. Ex. 2 | cationic | | no coating | | | ○ | x |
| *Comp. Ex. 3 | cationic | | no coating | | | ○ | x |

A mark *represents that no protection layer D was formed.

(A): plastic film
(A1): inorganic barrier layer
(B): water-trapping layer
(C): isocyanate type coating
(D): protection layer
10: water-barrier laminated film

The invention claimed is:

1. A water-barrier laminated film including a plastic film (A) that has an inorganic barrier layer (A1) on the surface thereof and a water-trapping layer (B), characterized in that:
between said inorganic barrier layer (A1) and said water-trapping layer (B), there is provided an isocyanate type coating (C) that contains, as a film-forming component, an isocyanate type polymer obtained by reacting an isocyanate as a reaction component;
said water-trapping layer (B) is formed directly on said isocyanate type coating (C) that is formed as an underlying layer;
said isocyanate type polymer is a polyurethane or a curing polymer obtained by curing an isocyanate reactive resin with a polyisocyanate; and
said polyurethane or said isocyanate reactive resin has a glass transition point of not lower than 60° C. and a weight average molecular weight (Mw) of larger than 41,000, and
a protection layer (D) is provided between said inorganic barrier layer (A1) and the isocyanate type coating (C), wherein only three layers in order of the protection layer (D), the isocyanate type coating (C) and the water-trapping layer (B) are formed on the inorganic barrier layer (A1) respectively.

2. The water-barrier laminated film according to claim 1, wherein said polyurethane has a crosslinked structure that is introduced therein due to at least one kind of functional group selected from the group consisting of an epoxy group, a silanol group and an isocyanate group.

3. The water-barrier laminated film according to claim 1, wherein said isocyanate reactive resin is a (meth)acrylic resin or a polyester resin.

4. The water-barrier laminated film according to claim 1, wherein said water-trapping layer (B) contains a hygroscopic polymer.

5. The water-barrier laminated film according to claim 4, wherein said water-trapping layer (B) has a structure in which a hygroscopic agent is dispersed in the hygroscopic matrix of an ionic polymer, the hygroscopic agent having an ultimate humidity lower than that of said matrix.

6. The water-barrier laminated film according to claim 5, wherein the ionic polymer contained in said water-trapping layer (B) is a cationic polymer.

7. The water-barrier laminated film according to claim 1, wherein said protection layer (D) contains a water-soluble polymer component (D1) and at least one kind of component (D2) selected from the group consisting of an organoalkoxysilane or a hydrolyzed product thereof, a metal alkoxide or a hydrolyzed product thereof, and a phosphorus type component.

8. A material for sealing electronic devices, including the water-barrier laminated film of claim 1.

9. The water-barrier laminated film according to claim 1, wherein the polyurethane or the isocyanate reactive resin has a weight average molecular weight (Mw) of 55,000 or higher.

* * * * *